May 27, 1930.　　　　L. BURN　　　　1,760,040
REVERSING GEAR
Filed July 27, 1928　　2 Sheets-Sheet 1
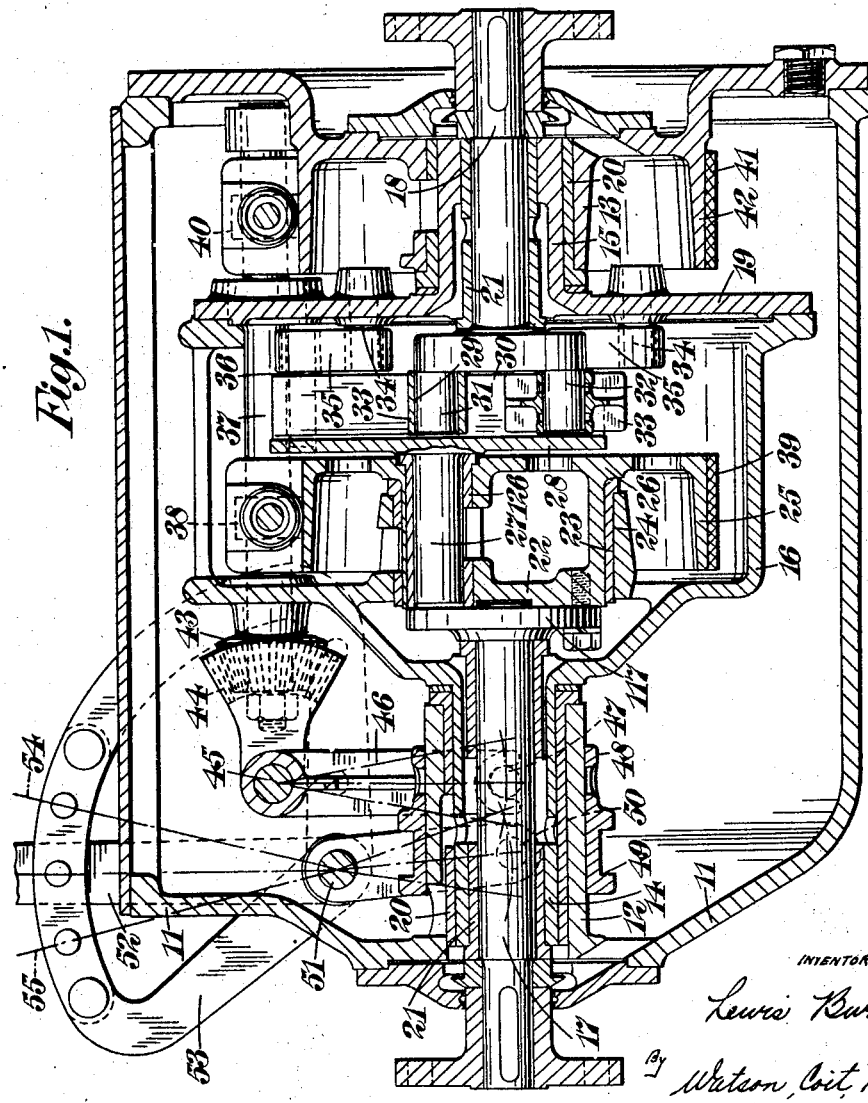

May 27, 1930.    L. BURN    1,760,040
REVERSING GEAR
Filed July 27, 1928    2 Sheets-Sheet 2
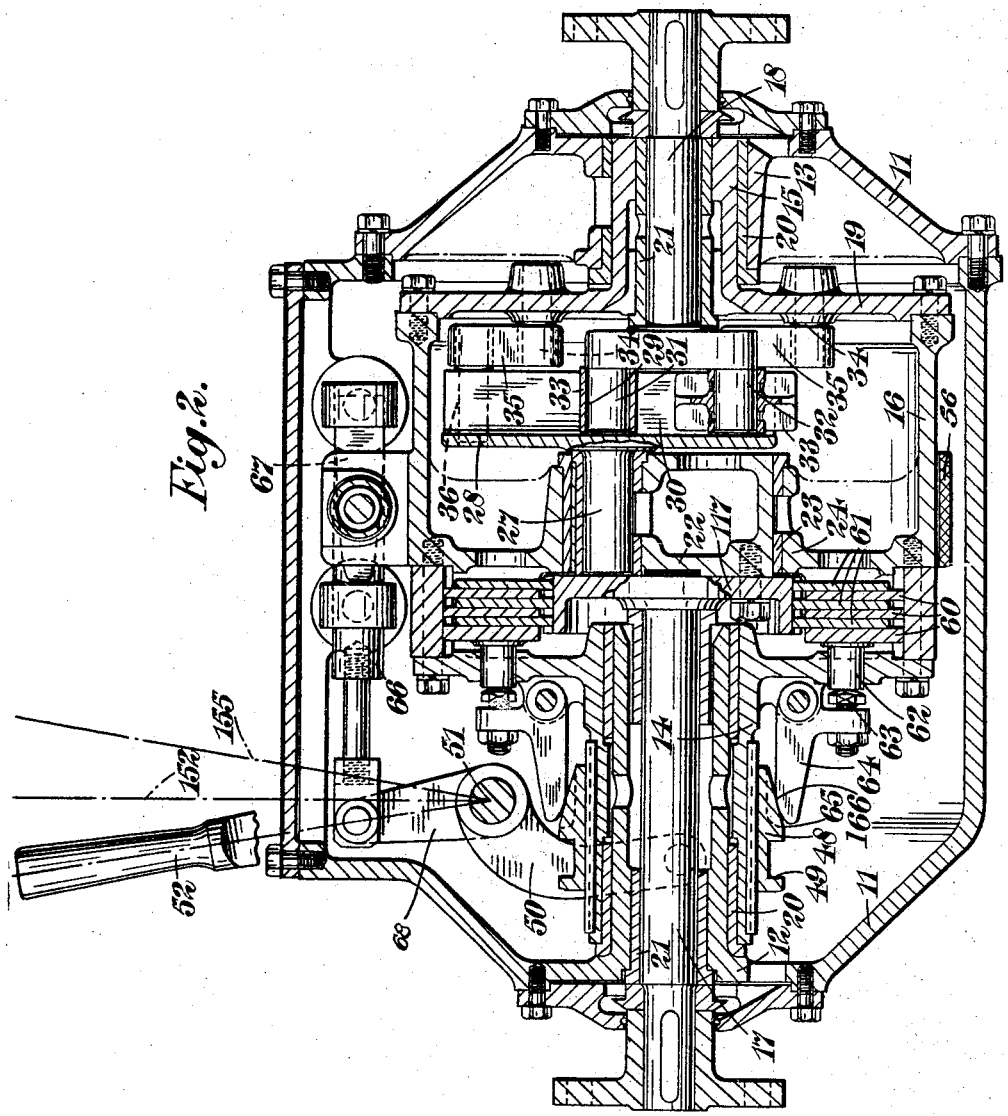
INVENTOR
Lewis Burn
By Watson, Coit, Morse & Grindle
Attys

Patented May 27, 1930

1,760,040

UNITED STATES PATENT OFFICE

LEWIS BURN, OF LONGPARISH, ENGLAND

REVERSING GEAR

Application filed July 27, 1928, Serial No. 295,777, and in Great Britain August 2, 1927.

This invention is for improvements in or relating to reversing gears, and an object of the invention is to provide an improved gear having a one-to-one reverse.

According to the primary feature of the present invention there is provided a reversing gear comprising a driving shaft, a coaxial driven shaft, a two-to-one gear connection between them, whereof the larger element is mounted eccentrically of the driving shaft, and means for locking said larger element to the driving shaft or alternatively permitting bodily eccentric movement, but preventing rotation of, the said larger element.

It will be appreciated that whilst for the sake of convenience the shafts are referred to in this specification as the driving shaft and the driven shaft respectively, since the effective gear has a one-to-one ratio, the shafts are interchangeable, and either shaft may be used as the driving shaft as is desired.

Preferably the invention is applied to reversing gears of the type comprising in combination a driving shaft operatively connected to a gear-carrying drum which is mounted to rotate coaxially with said shaft and is provided with a bearing eccentric to said shaft, a disc having diametrical slots therein and rotatably mounted in said bearing, a driven shaft coaxial with the driving shaft and provided at its end with a double crank whereof the arms engage in said slots, and a reversing disc connected to the slotted disc by a plurality of crank arms so proportioned as to permit bodily eccentric rotation of the said drum when the reversing disc is held stationary, this mechanism being of the type described in British Patent No. 14,931, June 23, 1914.

According to a further feature of the invention there is provided a reversing gear of the type above described wherein the gear-carrying drum is mounted directly upon the end of the driving shaft, and the reversing disc is adapted to be clutched either to the gear-carrying drum to rotate therewith or to a stationary part of gear. Conveniently one or both the clutching means for the reversing disc may be mounted thereon to rotate therewith, and may be such as to permit the disengagement of the reversing disc from both the drum and the stationary part of gear to provide a neutral position of the gear.

In a convenient construction according to the invention the means to clutch the reversing disc to the drum comprises a brake-band which acts upon the said drum or a part secured thereto, such as a brake-drum mounted thereon, and a cam-shaft mounted on the reversing-disc and operatively connected to the band-brake to actuate the same. Further, the means to clutch the reversing disc to a stationary part of the gear may comprise a reverse brake-band carried by the reversing disc surrounding a brake-drum on a stationary part of the gear-casing (e. g. the bearing of the driven shaft) and a cam shaft mounted on the reversing disc (e. g. the cam shaft above mentioned) and operatively connected to the said reverse brake-band.

According to another feature of the present invention there is provided a reversing gear of the type described wherein the gear, including the means to clutch the reversing disc to the gear-carrying drum, is substantially enclosed in a casing forming an extension of the reversing disc, which casing is rotatably mounted in bearings concentric with the driving and driven shafts, for instance, the casing may be rotatably supported by trunnion ends which themselves provide bearings for the driving and driven shafts.

It will be appreciated that the operation of a brake-band by a cam-shaft is well known, and such operation can be effected by rotation of the said cam-shaft, or by endwise movement thereof, or by a combination of both. According to another feature of the present invention the cam-shaft is operatively connected (e. g. by gearing) to a member which is mounted to rotate coaxially with the reversing disc and is arranged to be movable axially thereof to operate the cam-shaft.

There will now be described, as examples only, two constructions of reversing-gear according to the invention with reference to the accompanying drawings in which—

Figure 1 is a longitudinal cross-section of one construction of reversing gear; and Figure 2 is a longitudinal cross-section of another construction.

Referring to Figure 1, the gear and associated parts are contained in a main or stationary casing 11 which is substantially cylindrical and provided axially at its ends with bosses 12 and 13 having bushes 20 which form bearings receiving the trunnion ends 14 and 15 respectively of an inner cylindrical casing 16 which are free to rotate in the bearings. The trunnion ends themselves are tubular and have bushes 21 which constitute bearings for the driving and driven shafts 17 and 18 respectively. The end of the casing 16 adjacent to the shaft 18 forms the reversing disc 19. The shaft 17 extends through the trunnion end 14 to the inside of the inner casing 16 and has a flange 117 to which a cylindrical drum 22 is coaxially mounted. This drum is received in a bearing constituted by a bush 23 carried by an internal extension 24 of the casing 16 and is provided with a brake-drum 25 coaxial therewith and connected thereto by a web 26.

In the drum and mounted eccentrically of the driving shaft is a bearing 126 which receives an intermediate shaft 27 carrying at that end adjacent to the shaft 18 a disc 28 having two diametrical slots 29 and 30 therein, which slots are disposed at right-angles to one another. The shaft 18 which is coaxial with the shaft 17 extends through the trunnion end 15 into the inner casing 16 where it is provided at its end with a double crank whereof the arms 31 and 32 which are provided with slippers 33, extend into and engage in the aforesaid diametrical slots 29 and 30 respectively.

The reversing disc 19 is provided with four pins 34, symmetrically arranged with regard to its centre and connected by links 35 with pins 36 correspondingly placed on the slotted disc 28, the said pins 34 and 36 and links 35 forming in effect a plurality of crank-arms. If the centre of the slotted disc 28 is eccentric from the centre of the shaft 17 by a distance $e$, then the distance of the centre of each arm 31, 32 of the double crank from the centre of the shaft 18 is $e$ and the length of the links 35 is also $e$. The arrangement and operation of the drum 22, slotted disc 28, arms 31 and 32 of the double crank, reversing disc 19, pins 34 and 36 and the links 35 is substantially similar to that described in British Patent No. 14.931 of June 23, 1914.

Mounted in the inner casing towards the outside thereof is a rotatable cam-shaft 37 extending through the ends of the casing and lying parallel to the axis thereof. On this cam-shaft and within the casing there is provided a cam 38 co-operating with a brake-band 39, that is arranged to co-act with the brake-drum 25. Another cam 40 is provided on the cam-shaft 37 exterior of the casing 16 and co-operates with a brake-band 41 arranged to co-act with a reverse brake-drum 42, which is formed as an extension of the main casing 11. The cams 38 and 40 are arranged on the shaft 37 so that in one position of the shaft one brake only is on, rotation of the shaft takes both brakes off, and further rotation puts the other brake on.

Mounted on the end of the cam-shaft 37 adjacent the shaft 17 and exterior to the inner casing 16 is a bevel-wheel 43 meshing with a toothed quadrant 44 which latter is rotatably mounted upon a spindle 45 on a bracket (not shown) carried by the inner casing 16. This toothed quadrant 44 is fixed to one end of a link 46 the other end of which engages a stud 47 on a sleeve 48 arranged to slide axially on the boss 12. The sleeve 48 is provided with a groove 49 engaged by a striker 50 which is connected to spindle 51 rotatably mounted in the main casing 11. This spindle 51 extends outside the casing and has a hand-lever 52 connected thereto outside the main casing.

The hand-lever is arranged to be placed in one of three positions, in a guide 53, and is shown at the neutral position in Figure 1, 54 indicating the forward speed position and 55 the reverse speed position. By adjustment of the lever the sleeve can be moved to a definite position along the trunnion, thereby imparting by means of the link 46 a definite rotation to the bevel-wheel 43 and cam-shaft 37. Thus either the forward-brake-band 39 is actuated, or both brake-bands 39 and 41 are released, or the reverse-brake-band 41 is actuated to provide the respective speeds as will hereinafter be explained.

To obtain forward speed the hand-lever 52 is operated so that by the mechanism above described the forward-brake-band 39 is gripped to the forward-brake-drum 25, thereby causing the inner casing 16 to rotate with the shaft 17, it being understood that the reverse-brake-band 41 is released. The cam-shaft 37 is carried round with the casing 16, but since the sleeve 48 is not moved it maintains the same position relative to the inner casing 16. Since the reverse disc 19 is rotating at the same speed as the shaft 17 the slotted disc 28 cannot rotate on its bearing as it is held by the links 35, therefore the shaft 18 will be turned at the same rate as and in the same direction as the shaft 17. It will be appreciated that in effect the gear becomes a solid drive from one end to the other.

For neutral gear the hand-lever 52 is operated so that both brake-bands 39 and 41 are released, thus the slotted disc 28 is carried round in its eccentric orbit. The inner casing 16 is free to rotate and as it is connected by links 35 to the slotted disc 28 both the inner casing and the slotted disc rotate about their own axes in the opposite direction to the shaft 17 thereby neutralizing the bodily rotation of the slotted disc 28, and permitting the shaft 18 to remain stationary.

For reverse speed the hand-lever 52 is positioned so that the forward-brake-band 39 is released and the reverse-brake-band 41 grips the stationary drum 42, thus the inner casing 16 and reversing disc 19 are maintained in a stationary position. Consequently the slotted disc 28 is carried round in its orbit but owing to the action of the links 35 the relative directions of the slots remain the same, that is to say the disc 28 moves so that each slot remains parallel to its original position. Thus it will be seen that the slotted disc 28 is rotated bodily in the same direction as the driving shaft 17 and that by the action of the arms 31 and 32 of the double crank in the slots 29 and 30 the shaft 18 is rotated in an opposite direction to the driving shaft 17 and at one equal speed.

In Figure 1 the drum 22 is arranged to be coupled to the reversing disc 19 by means of the brake drum 25 on the drum 22 and the brake-band 39 connected to the reversing-disc 19 through the casing 16. Alternatively the drum 22 may be coupled to the reverse disc by means of a clutch such as a plate clutch.

It will also be understood that for obtaining the reverse motion, instead of employing as in Figure 1 the brake-band 41 on the reversing disc 19 and a brake-drum 42 on the outer casing for coupling the reversing disc to the outer casing 11, a brake-band may be mounted on the outer casing and be operative upon a brake-drum mounted on or integral with the reversing disc 19 or inner casing 16.

Referring to Figure 2 which shows a construction of gear embodying both of these modifications, there is carried by the casing 16 one set of plates 60 of a multi-plate clutch, the set of plates 61 thereof being carried by the flange 117 of the driving-shaft 17. The clutch is operated by sliding members 62 which are engaged by contact studs 63 adjustably carried in levers 64 pivotally mounted upon the casing 16. The sleeve 48 is in this construction formed with an inclined surface 65 which engages extensions 166 of the levers 64 in such manner that when the hand-lever 52 is moved to the position for forward motion, as shown in Figure 2, the clutch 60, 61 is engaged by the resulting movement of the levers 64. In the position 152 of the hand-lever for neutral gear and the position 155 for reverse motion the sleeve 48 is removed from the levers 64 and the clutch 60, 61 is free.

The coupling of the reversing disc 19 to the outer casing 11 for reverse motion is effected by means of a brake band 56 which is operative upon the casing 16. This brake-band is operated by a bar 66 supported for sliding movement on the main casing 11 and having an inclined surface 67 engaging with a correspondingly inclined part of the brake-band 56. This bar 66 is coupled to the end of a crank-arm 68 on the spindle 51 in such a manner that when the hand-lever 52 is moved to the position 155 for reverse motion the bar 66 is moved to the right in Figure 2 to tighten the brake-band 56 upon the casing 16. In other positions of the hand-lever 52 the casing 16 is free of the brake-band 56.

In constructions of the gear such as that shown in Figure 2 the casing 11 may be dispensed with provided the shafts 17 and 18 are otherwise supported and the parts directly associated therewith such as the spindle 51 and the bar 66 are mounted on a suitable stationary abutment.

It is to be understood that the invention is not restricted to the precise details set forth, as it is clear that many modifications may be made which lie within the scope of the invention.

I claim:

1. A reversing gear comprising in combination a driving shaft, a drum operatively connected to the driving shaft and mounted to rotate coaxially therewith, an eccentric bearing in the drum, a disc having diametrical slots therein and rotatably mounted in said bearing, a driven shaft coaxial with the driving shaft and provided at its end with a double crank whereof the arms engage in said slots, a reversing disc, a plurality of crank arms connecting the slotted disc to the reversing disc and means for clutching the reversing disc either to the drum to rotate therewith or to a stationary part of the gear, for the purpose described.

2. A reversing gear comprising in combination a driving shaft, a drum operatively connected to the driving shaft and mounted to rotate coaxially therewith, an eccentric bearing in the drum, a disc having diametrical slots therein and rotatably mounted in said bearing, a driven shaft coaxial with the driving shaft and provided at its end with a double crank whereof the arms engage in said slots, a reversing disc, a plurality of crank arms connecting the slotted disc to the reversing disc, means for clutching the reversing disc to the said drum and means alternatively operable for clutching the reversing-disc to a stationary part of the gear comprising a reversing brake-shoe carried on the reverse disc and means for engaging the brake-shoe with the said stationary part of the gear.

3. A reversing gear as claimed in claim 1 wherein the means for clutching the reversing disc either to the aforesaid drum or to the stationary part of the gear comprises operating mechanism having a neutral position in which the reversing disc is free both of the drum and the stationary part of the gear, so as to provide a neutral position of the gear.

4. A reversing gear as claimed in claim 1 wherein the means for clutching the reversing disc to the aforesaid drum comprises a forward brake-band operative to brake the said drum and a cam-shaft, mounted on the reversing disc and operatively connected to the brake-band to actuate the same.

5. A reversing gear comprising in combination a driving shaft, a drum operatively connected to the driving shaft and mounted to rotate coaxially therewith, an eccentric bearing in the drum, a disc having diametrical slots therein and rotatably mounted in said bearing, a driven shaft coaxial with the driving shaft and provided at its end with a double crank whereof the arms engage in said slots, a reversing disc, a plurality of crank arms connecting the slotted disc to the reversing disc, means for clutching the reversing disc to the said drum and means alternatively operable for clutching the reversing disc to a stationary part of the gear comprising a reverse-brake-band carried by the reversing disc, a brake-drum on a stationary part of the gear casing and surrounded by said reverse-brake-band and a cam-shaft mounted on the reversing disc and operatively connected to the said reverse-brake-band.

6. A reversing gear as claimed in claim 1 wherein the means for clutching the reversing disc to the drum comprises a forward brake-band which is operative to brake the said drum and the means for clutching the reversing disc to a stationary part of the gear comprises a reverse-brake-band carried by the reversing disc and a brake-drum on a stationary part of the gear and wherein a cam-shaft is mounted on the reversing disc and operatively connected to the said forward brake-band and the said reverse-brake-band to actuate them alternatively for the purpose described.

7. A reversing gear comprising in combination a driving shaft, a drum operatively connected to the driving shaft and mounted to rotate coaxially therewith, an eccentric bearing in the drum, a disc having diametrical slots therein and rotatably mounted in said bearing, a driven shaft coaxial with the driving shaft and provided at its end with a double crank whereof the arms engage in said slots, a reversing disc, a plurality of crank arms connecting the slotted disc to the reversing disc, means for clutching the reversing disc either to the gear carrying drum to rotate therewith or to a stationary part of the gear and a casing for the gear parts comprising forming an extension of the reversing disc, which casing is rotatably mounted in bearings concentric with the driving and driven shafts.

8. A reversing gear comprising in combination a driving shaft, a drum operatively connected to the driving shaft and mounted to rotate coaxially therewith, an eccentric bearing in the drum, a disc having diametrical slots therein and rotatably mounted in said bearing, a driven shaft coaxial with the driving shaft and provided at its end with a double crank whereof the arms engage in said slots, a reversing disc, a plurality of crank arms connecting the slotted disc to the reversing disc, means for clutching the reversing disc to the drum comprising a forward brake-band which is operative to brake the said drum, means for clutching the reversing disc to a stationary part of the gear comprising a reverse-brake-band carried by the reversing disc and a brake-drum on a stationary part of the gear casing and a cam-shaft mounted on the reversing disc and operatively connected to the said forward brake-band and the said reverse-brake-band to actuate them alternatively in combination with an operating member coupled to the cam-shaft and mounted to rotate coaxially with the reversing disc and to be movable axially thereof to operate the cam-shaft.

In testimony whereof I affix my signature.
LEWIS BURN.